(12) United States Patent
Yoon et al.

(10) Patent No.: US 9,864,514 B2
(45) Date of Patent: Jan. 9, 2018

(54) METHOD AND ELECTRONIC DEVICE FOR DISPLAYING VIRTUAL KEYPAD

(71) Applicant: Samsung Electronics Co., Ltd., Suwon-si, Gyeonggi-do (KR)

(72) Inventors: Pil-Joo Yoon, Seongnam-si (KR);
Jin-Hong Jeong, Yongin-si (KR);
Geon-Soo Kim, Suwon-si (KR);
Jeong-Hyun Pang, Seongnam-si (KR);
Yong-Joon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 14/175,053

(22) Filed: Feb. 7, 2014

(65) Prior Publication Data

US 2014/0237412 A1 Aug. 21, 2014

(30) Foreign Application Priority Data

Feb. 21, 2013 (KR) ........................ 10-2013-0018787

(51) Int. Cl.
*G06F 3/048* (2013.01)
*G06F 3/0488* (2013.01)

(52) U.S. Cl.
CPC ................................ *G06F 3/04886* (2013.01)

(58) Field of Classification Search
CPC .. G06F 3/04886; G06F 3/017; G06F 3/04883;
G06F 1/1626; G06F 3/0488; G06F 1/169;
G06F 3/013; G06F 3/041; G06F 3/0484;
G06F 3/0304; G06F 3/01; G06F 3/0233;
G06F 3/0237; G06F 3/0416; G06F 3/04
See application file for complete search history.

(56) References Cited

U.S. PATENT DOCUMENTS

| | | | |
|---|---|---|---|
| 8,629,847 B2 * | 1/2014 | Arai | G06F 3/0488 345/173 |
| 2005/0210020 A1 * | 9/2005 | Gunn | G06F 3/0237 |
| 2006/0161870 A1 | 7/2006 | Hotelling et al. | |
| 2006/0161871 A1 | 7/2006 | Hotelling et al. | |
| 2010/0107099 A1 | 4/2010 | Frazier et al. | |
| 2010/0141590 A1 | 6/2010 | Markiewicz et al. | |
| 2010/0328112 A1 * | 12/2010 | Liu | G06F 3/0233 341/24 |
| 2010/0328209 A1 * | 12/2010 | Nakao | G06F 3/0488 345/157 |
| 2011/0221693 A1 | 9/2011 | Miyazaki | |
| 2012/0050007 A1 | 3/2012 | Forutanpour et al. | |

(Continued)

FOREIGN PATENT DOCUMENTS

| KR | 20050100084 A | 10/2005 |
|---|---|---|
| KR | 20090101741 A | 9/2009 |

(Continued)

*Primary Examiner* — Di Xiao
(74) *Attorney, Agent, or Firm* — Jefferson IP Law, LLP

(57) ABSTRACT

A method and an electronic device for controlling a virtual keypad are provided. The method for displaying the virtual keypad of the electronic device includes detecting execution of an application allowing text input, detecting at least one touch subject within a threshold distance of a touch screen, and when detecting at least one touch subject within the threshold distance of the touch screen, displaying a virtual keypad.

20 Claims, 19 Drawing Sheets

(56) References Cited

U.S. PATENT DOCUMENTS

| | | | |
|---|---|---|---|
| 2012/0068948 A1* | 3/2012 | Tomoda | G06F 3/04886 345/173 |
| 2012/0084691 A1* | 4/2012 | Yun | H04M 1/72519 715/769 |
| 2012/0105331 A1 | 5/2012 | Nomoto | |
| 2012/0306740 A1* | 12/2012 | Hoda | G06F 3/0304 345/156 |
| 2013/0086490 A1* | 4/2013 | Roskind | G06F 17/30902 715/760 |
| 2013/0279744 A1* | 10/2013 | Ingrassia, Jr. | G06F 21/32 382/103 |

FOREIGN PATENT DOCUMENTS

| | | |
|---|---|---|
| KR | 20110028772 A | 3/2011 |
| KR | 20120023642 A | 3/2012 |

\* cited by examiner

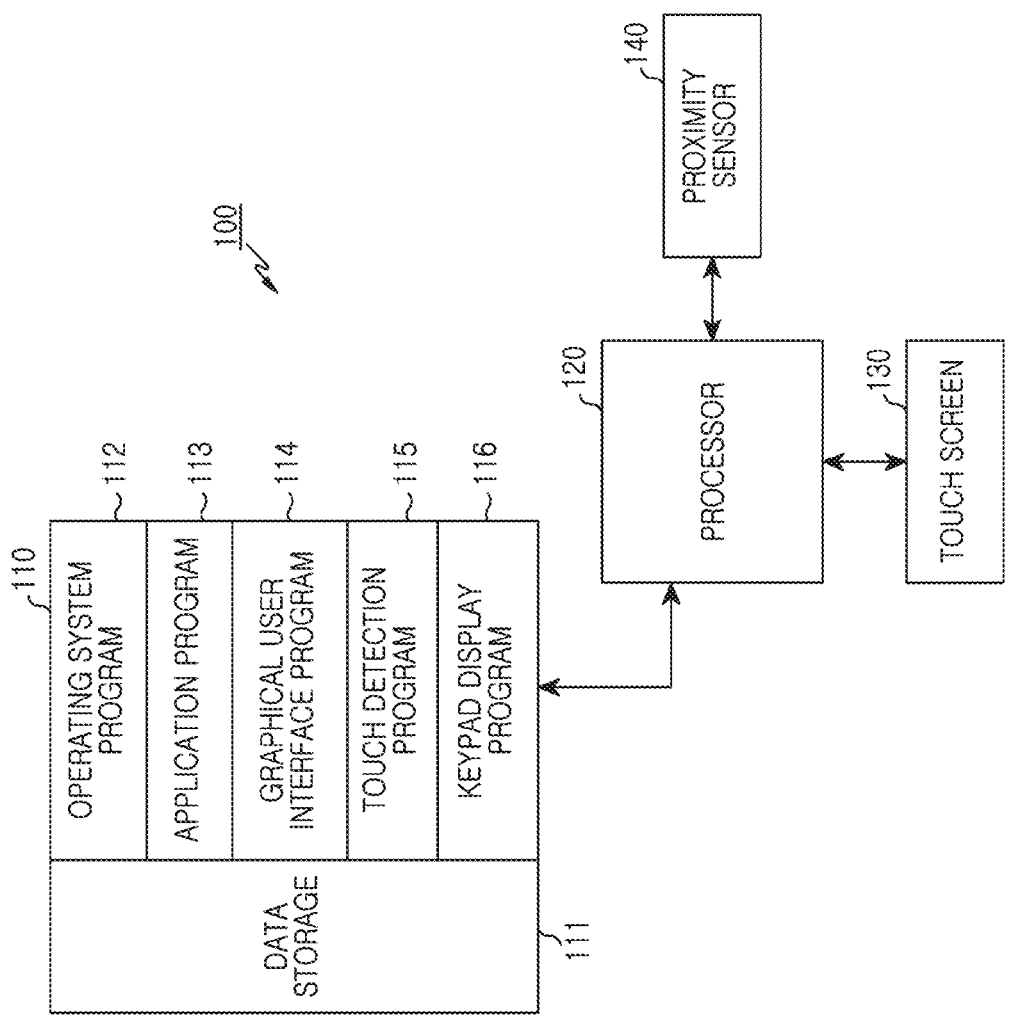

METHOD AND ELECTRONIC DEVICE FOR DISPLAYING VIRTUAL KEYPAD

CROSS-REFERENCE TO RELATED APPLICATION(S)

This application claims the benefit under 35 U.S.C. §119(a) of a Korean patent application filed on Feb. 21, 2013 in the Korean Intellectual Property Office and assigned Serial No. 10-2013-0018787, the entire disclosure of which is hereby incorporated by reference.

TECHNICAL FIELD

The present disclosure relates to an electronic device. More particularly, the present disclosure relates to a method and an apparatus for displaying a virtual keypad in the electronic device.

BACKGROUND

As electronic devices such as smart phone and tablet Personal Computer (PC) rapidly advance, the electronic device allowing wireless voice call and information exchange becomes necessary for daily life. When the electronic device was first introduced, the electronic device provided the features of portability and wireless communication. As technology has advanced and wireless Internet was introduced, in order to meet users' evolving demands, advanced electronic devices are now provided as multimedia devices supporting functions such as schedule management functionality, game play functionality, remote control functionality, image capturing functionality, and projector functionality. Accordingly, the electronic device providing a plurality of functions has become a necessity in the users' life.

In particular, as the electronic device including a touch screen for inputting and outputting data at the same time have been developed, various user interfaces using the touch screen are provided. For example, most of the electronic devices according to the related art using the touch screen receive characters from a user by displaying a virtual keypad on the touch screen without a physical keypad. More specifically, when an application for inputting the characters is executed and a text input window or a text input menu is selected under user's control, the electronic device displays the virtual keypad allowing the text input.

However, for the text input, the related art needs to select the text input window or the text input menu every time the user wants the text input. As a result, when the user repeatedly exchanges text messages from other user, the user needs to display the virtual keypad by touching the text input window and then input the text using the displayed virtual keypad for every text input.

In this respect, there is a need for a method that simplifies the text input.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure to provide a method and an apparatus for displaying a virtual keypad in an electronic device.

Another aspect of the present disclosure is to provide a method and an apparatus for obtaining a user's text input intention in an electronic device.

Another aspect of the present disclosure is to provide a method and an apparatus for displaying a virtual keypad by detecting a touch subject within a threshold distance from a touch screen in an electronic device.

Another aspect of the present disclosure is to provide a method and an apparatus for obtaining user's text input completion by detecting a touch subject moving away from a touch screen in an electronic device.

Another aspect of the present disclosure is to provide a method and an apparatus for deleting a displayed virtual keypad by detecting user's text input completion in an electronic device.

In accordance with an aspect of the present disclosure, a method for controlling an electronic device is provided. The method includes detecting execution of an application allowing text input, detecting at least one touch subject within a threshold distance of a touch screen, and when detecting at least one touch subject within the threshold distance of the touch screen, displaying a virtual keypad.

In accordance with another aspect of the present disclosure, an electronic device is provided. The device includes at least one processor, a touch-sensitive display, a memory, and at least one program stored in the memory and configured for execution by the at least one processor. The program includes instructions for detecting execution of an application allowing text input, for detecting at least one touch subject within a threshold distance of a touch screen, and for displaying a virtual keypad when detecting at least one touch subject within the threshold distance of the touch screen.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 1A is a block diagram of an electronic device for displaying a virtual keypad according to an embodiment of the present disclosure;

Throughout the drawings, like reference numerals will be understood to refer to like parts, components and structures.

DETAILED DESCRIPTION

Figure 1B:
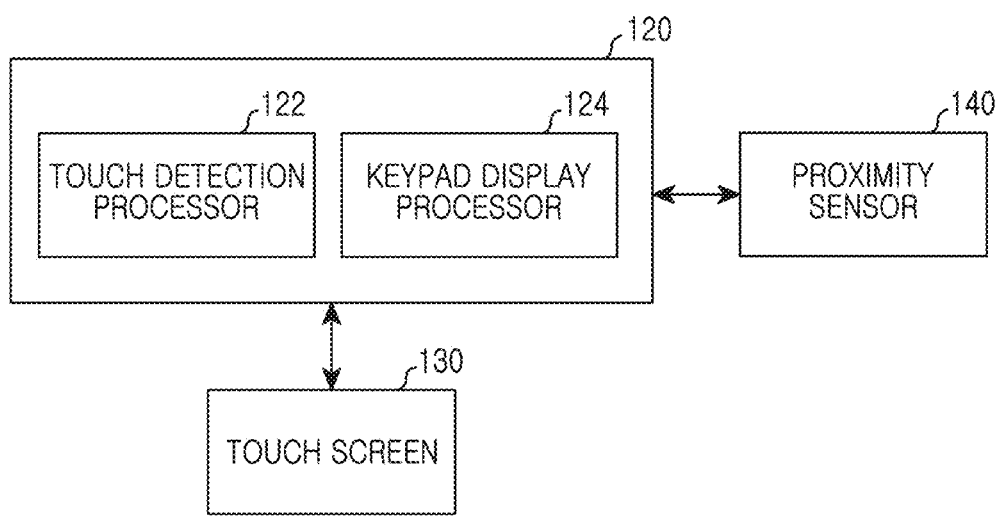
FIG. 1B is a block diagram of a processor for displaying a virtual keypad according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As a non-exhaustive illustration only, an electronic device described herein may refer to a mobile communication terminal allowing touch input, a smart phone, a Personal Digital Assistant (PDA), a handheld e-book, a tablet Personal Computer (PC), a Portable/Personal Multimedia Player (PMP), a portable game console, a digital camera, an MP3 player, a navigation system, a laptop, a netbook, a computer, a television, a refrigerator, an air conditioner, and the like.

FIG. 1A is a block diagram of an electronic device for displaying a virtual keypad according to an embodiment of the present disclosure.

Referring to FIG. 1A, the electronic device 100 includes a memory 110, a processor 120, a touch screen 130, and a proximity sensor 140. The electronic device 100 may include a plurality of memories 110, and/or a plurality of processors 120.

The memory 110 includes a data storage 111, an operating system program 112, an application program 113, a graphical user interface program 114, a touch detection program 115, a keypad display program 116, and/or the like. The program being a software component can be represented as a set of instructions. Hence, the program may be referred to as an instruction set. The program may be also referred to as a module.

The memory 110 can store one or more programs including instructions for realizing various embodiments of the present disclosure.

The data storage 111 stores data generated during the performance of a function corresponding to the program stored in the memory 110. The data storage 111 can store a touch detection range of the touch screen 130 for virtual keypad display. For example, the data storage 111 can store the touch detection range for detecting a touch subject within a threshold distance of the touch screen 130.

In addition, the data storage 111 can store a touch detection time corresponding to the touch detection range. More specifically, when the touch subject is detected within the threshold distance of the touch detection range, the data storage 111 can store a threshold time for detecting the detected touch subject as the touch. In so doing, the data storage 111 can store two or more different touch detection ranges, and store different touch detection times based on the touch detection range.

The operating system program 112 (e.g., the embedded operating system such as WINDOWS, LINUX, Darwin, RTXC, UNIX, OS X, VxWorks, or the like) includes various software components for controlling general system operations. As an example, the various software components for controlling general system operations may include memory management and control, storage hardware (device) control and management, power control and management, and/or the like. The operating system program 112 processes normal communication between various hardware (devices) and software components (programs).

The application program 113 includes applications such as browser, e-mail, message, word processing, address book, widget, Digital Right Management (DRM), voice recognition, voice reproduction, position determining function, location based service, call, schedule management, task management, and/or the like.

The graphical user interface program 114 includes at least one software component for providing a user interface using graphics between the user and the electronic device 100. For example, the graphical user interface program 114 includes at least one software component for displaying user interface information on the touch screen 130. According to various embodiments of the present disclosure, when the touch detection program 114 detects the touch, the graphical user interface program 114 includes an instruction for displaying the virtual keypad.

Further, according to various embodiments of the present disclosure, the graphical user interface program 114 includes an instruction for displaying the virtual keypad. When the touch detection program 114 detects the touch subject within the threshold distance of the touch screen 130 over the threshold time, the graphical user interface program 114 may display the virtual keypad. The graphical user interface program 114 includes an instruction for displaying a guideline for the virtual keypad display. In so doing, when the touch subject is detected within the threshold distance of the displayed virtual guideline, the graphical user interface program 114 may display the virtual keypad.

According to various embodiments of the present disclosure, the graphical user interface program 114 includes an instruction for deleting the displayed virtual keypad. When the virtual keypad is displayed and the touch detection program 114 detects the touch subject moving away from the touch screen 130, the graphical user interface program 114 may delete the displayed virtual keypad (or otherwise stop displaying the displayed virtual keypad).

The touch detection program 115 can detect the touch of the touch subject on the touch screen 130. The touch subject includes a user's finger, a digital pen, and a touchable object. For example, the touch detection program 115 can detect the user's finger touching the touch screen 130. As another example, the touch detection program 115 can detect the digital pen touching the touch screen 130. As another example, touch detection program 115 can detect the object touching the touch screen 130.

The touch detection program 115 can detect the touch subject within the threshold distance of the touch screen 130. The touch detection program 115 can detect the touch subject within the threshold distance from the touch screen 130 based on a well-known technique (e.g., image recognition) such as hovering. The touch detection program 115 can detect the touch subject within the threshold distance from the touch screen 130 using the proximity sensor 140. For example, the touch detection program 115 can detect the touch subject within the threshold distance from the touch screen 130 using at least one of a capacitive sensor, an inductive proximity sensor, a magnetic proximity sensor, a Hall sensor, an optical proximity sensor, an ultrasonic proximity sensor, and the like.

For example, the touch detection program 115 can detect the user's finger within the threshold distance of the touch screen 130. For example, the touch detection program 115 can detect the digital pen within the threshold distance of the touch screen 130.

The touch detection program 115 can detect the number of touch subjects in the threshold distance of the touch screen 130. For example, the touch detection program 115 can detect two user fingers within the threshold distance of the touch screen 130.

When the touch subject stays (e.g., is maintained) in the threshold distance of the touch screen 130 over the threshold time, the touch detection program 115 can recognize that the corresponding touch subject touches the touch screen 130.

The touch detection program 115 can detect the touch subject in a preset touch detection range of the touch screen 130. The touch detection range can occupy all or part of the touch screen 130. According to various embodiments of the present disclosure, the touch detection range may include at least one region.

When the touch is detected in the text input window, the keypad display program 116 can display the virtual keypad. More specifically, when the text input application is executed and the touch is detected in the text input window, the keypad display program 116 can display the virtual keypad. For example, when a message application is executed and the user finger touches the text input window, the keypad display program 116 can display the virtual keypad. For example, when an Internet application is executed and the digital pen touches an address input window, the keypad display program 116 can display the virtual keypad.

When the touch subject is detected in the threshold distance of the touch screen 130, the keypad display program 116 can display the virtual keypad. In more detail, when the touch screen 130 is not touched directly or physically and the touch subject is detected in the preset touch detection range of the touch screen 130 over the threshold time, the keypad display program 116 can display the virtual keypad.

After the virtual keypad is displayed, when the touch subject disappears from the threshold distance of the touch screen, the keypad display program 116 can delete the displayed virtual keypad (e.g., stop displaying the displayed virtual keypad). In so doing, the keypad display program 116 can delete the displayed virtual keypad according to an area of the detected touch subject or a distance of the touch subject from the touch screen 130. When the area of the detected touch subject falls below a threshold or the touch subject moves away from the touch screen 130 over a threshold distance, the keypad display program 116 can delete the displayed virtual keypad completely (e.g., stop displaying the displayed virtual keypad). In addition, the keypad display program 116 can control display characteristics such as color, transparency, size, shape, and thickness of the displayed virtual keypad, according to the area of the detected touch subject or the distance of the touch subject from the touch screen 130. For example, when the area of the detected touch subject gradually decreases or the touch subject gradually moves away from the touch screen 130, the keypad display program 116 can blur the displayed virtual keypad by controlling its color or transparency. For example, when the currently detected area of the touch subject is smaller than the previously detected area of the touch subject, the keypad display program 116 can display the virtual keypad more vaguely than before. When the currently detected distance of the touch subject from the touch screen 130 is greater than the previously detected distance of the touch subject from the touch screen 130, the keypad display program 116 can display the virtual keypad more vaguely than before. In contrast, when the area of the detected touch subject gradually increases or the touch subject gets close to the touch screen 130, the keypad display program 116 can display the virtual keypad more clearly than before.

When the area of the detected touch subject falls below the threshold or the touch subject moves away from the touch screen 130 over the threshold distance, the keypad display program 116 can delete the virtual keypad completely (e.g., stop displaying the displayed virtual keypad).

The processor 120 can include at least one processor (not shown) and a peripheral interface (not shown). The processor 120 executes a particular program (instruction set) stored in the memory 110 and conducts particular functions corresponding to the program.

The touch screen 130 is a touch-sensitive display and provides an interface for the touch input/output between the electronic device 100 and the user. The touch screen 130 is a medium for detecting the touch (or the contact) through a touch sensor (not shown), for sending the detected touch input to the electronic device 100, and for providing a visual output of the electronic device 100 to the user. For example, in response to the touch input, the touch screen 130 provides the visual output to the user based on text, graphics, video, and/or the like.

The touch screen 130 includes a touch-sensitive surface for detecting the user's touch input, and detects the user touch input using haptic contact, tactile contact, or a combination thereof For example, the detected touch point of the touch screen 130 corresponds to a digit of the finger used to contact the touch-sensitive surface. On the touch-sensitive surface, the touch screen 130 detects the contact of an external device such as stylus pen. The detected contact is converted to an interaction corresponding to the user interface (e.g., a soft key) displayed on the touch screen 130.

The touch screen 130 provides an interface for the touch input/output between the electronic device 100 and the user. Namely, the touch screen 130 is a medium for sending the user's touch input to the electronic device 100 and representing the visual output of the electronic device 100 to the user. The touch screen 130 can adopt various display technologies such as Liquid Crystal Display (LCD), Light Emitting Diode (LED), Light emitting Polymer Display (LPD), Organic LED (OLED), Active Matrix OLED (AMOLED), Flexible LED (FLED), and/or the like. The touch screen 130 is not limited to a touch screen using those display technologies. The touch screen 130 can detect the contact start, the contact movement, or the contact abortion or end on the touch-sensitive surface using, but not limited to, various touch detection (sensing) techniques such as capacitive, resistive, infrared or surface sound wave detections. The touch screen 130 can detect the touch subject within the threshold distance from the touch screen 130. In so doing, the touch screen 130 can detect the touch subject within the threshold distance from the touch screen 130, based on the well-known method such as hovering. When detecting the touch subject in the threshold distance of the preset touch detection range, the touch screen 130 can display the virtual keypad. In contrast, when the touch subject disappears from the threshold distance of the preset touch detection region, the touch screen 130 can delete the displayed virtual keypad (e.g., stop displaying the displayed virtual keypad).

FIG. 1B is a block diagram of the processor for displaying a virtual keypad according to an embodiment of the present disclosure.

Referring to FIG. 1B, the processor 120 includes a touch detection processor 122 and a keypad display processor 124.

The touch detection processor 122 can detect the touch of the touch subject on the touch screen 130. The touch subject includes the user's finger, the digital pen, and the touchable object. For example, the touch detection processor 122 can detect the user's finger touching the touch screen 130. As another example, the touch detection processor 122 can detect the digital pen touching the touch screen 130. As another example, the touch detection processor 122 can detect the touchable object touching the touch screen 130.

The touch detection processor 122 can detect the touch subject within the threshold distance of the touch screen 130. The touch detection processor 122 can detect the touch subject within the threshold distance from the touch screen 130 based on the well-known technique (e.g., image recognition) such as hovering. The touch detection processor 122 can detect the touch subject within the threshold distance from the touch screen 130 using the proximity sensor 140. For example, the touch detection processor 122 can detect the touch subject within the threshold distance from the touch screen 130 using at least one of the capacitive sensor, the inductive proximity sensor, the magnetic proximity sensor, the Hall sensor, the optical proximity sensor, the ultrasonic proximity sensor, and the like.

For example, the touch detection processor 122 can detect the user's finger within the threshold distance of the touch screen 130. For example, the touch detection processor 122 can detect the digital pen within the threshold distance of the touch screen 130.

The touch detection processor 122 can detect the number of the touch subjects in the threshold distance of the touch screen 130. For example, the touch detection processor 122 can detect two user fingers within the threshold distance of the touch screen 130.

When the touch subject stays (e.g., is maintained) in the threshold distance of the touch screen 130 over the threshold time, the touch detection processor 122 can recognize that the corresponding touch subject touches the touch screen 130.

The touch detection processor 122 can detect the touch subject in the preset touch detection range of the touch screen 130. The touch detection range can occupy all or part of the touch screen 130. According to various embodiments of the present disclosure, the touch detection range may include at least one region.

When the touch is detected in the text input window, the keypad display processor 124 can display the virtual keypad. More specifically, when the text input application is executed and the touch is detected in the text input window, the keypad display processor 124 can display the virtual keypad. For example, when the message application is executed and the user finger touches the text input window, the keypad display processor 124 can display the virtual keypad. For example, when the Internet application is executed and the digital pen touches the address input window, the keypad display processor 124 can display the virtual keypad.

When the touch subject is detected in the threshold distance of the touch screen 130, the keypad display processor 124 can display the virtual keypad. In more detail, when the touch screen 130 is not touched directly or physically and the touch subject is detected in the preset touch detection range of the touch screen 130 over the threshold time, the keypad display processor 124 can display the virtual keypad.

After the virtual keypad is displayed, when the touch subject disappears from the threshold distance of the touch screen, the keypad display processor 124 can delete the displayed virtual keypad (e.g., stop displaying the displayed virtual keypad). In so doing, the keypad display processor 124 can delete the displayed virtual keypad according to the area of the detected touch subject or the distance of the touch subject from the touch screen 130. When the area of the detected touch subject falls below the threshold or the touch subject moves away from the touch screen 130 over the threshold distance, the keypad display processor 124 can delete the displayed virtual keypad completely (e.g., stop displaying the displayed virtual keypad). In addition, the keypad display processor 124 can control the display characteristics such as color, transparency, size, shape, and thickness of the displayed virtual keypad, according to the area of the detected touch subject or the distance of the touch subject from the touch screen 130. For example, as the area of the detected touch subject gradually decreases or the touch subject gradually moves away from the touch screen 130, the keypad display processor 124 can blur the displayed virtual keypad by controlling its color or transparency. For example, when the currently detected area of the touch subject is smaller than the previously detected area of the touch subject, the keypad display processor 124 can display the virtual keypad more vaguely than before. When the currently detected distance of the touch subject from the touch screen 130 is greater than the previously detected distance of the touch subject from the touch screen 130, the keypad display processor 124 can display the virtual keypad more vaguely than before. In contrast, as the area of the detected touch subject gradually increases or the touch subject gets close to the touch screen 130, the keypad display processor 124 can display the virtual keypad more clearly than before.

When the area of the detected touch subject falls below the threshold or the touch subject moves away from the touch screen 130 over the threshold distance, the keypad display processor 124 can delete the virtual keypad completely (e.g., stop displaying the displayed virtual keypad).

Figure 2:
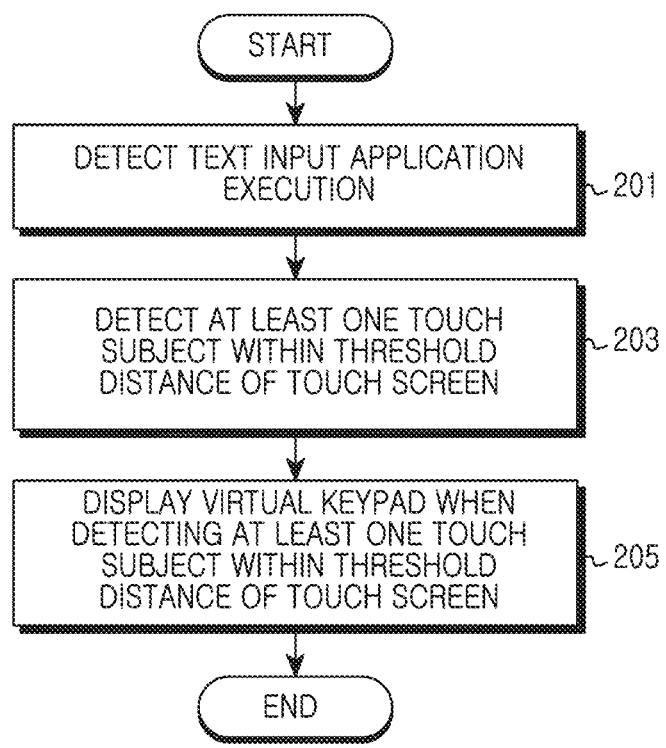
FIG. 2 is a flowchart of a method for displaying a virtual keypad in an electronic device according to an embodiment of the present disclosure.

FIG. 2 is a flowchart of a method for displaying a virtual keypad in an electronic device according to an embodiment of the present disclosure.

Referring to FIG. 2, at operation 201, the electronic device 100 detects the execution of the text input application. The text input application includes a message application, a messenger application, an Internet application, a note input application, and/or the like.

At operation 203, the electronic device 100 detects at least one touch subject within the threshold distance of the touch screen. The touch subject includes the user's finger, the digital pen, and the touchable object. For example, the electronic device 100 can detect the user's finger within the threshold distance of the touch screen 130. As another example, the electronic device 100 can detect the digital pen within the threshold distance of the touch screen 130. As another example, the electronic device 100 can detect the touchable object within the threshold distance the touch screen 130.

At operation 205, when the electronic device 100 detects at least one touch subject within the threshold distance of the touch screen 130, the electronic device 100 can display the virtual keypad. In so doing, when the touch subject stays in the threshold distance of the touch screen 130 over the threshold time, the electronic device 100 can display the virtual keypad. The threshold time can be preset and stored at the design phase, and changed by the user control.

Figure 3:
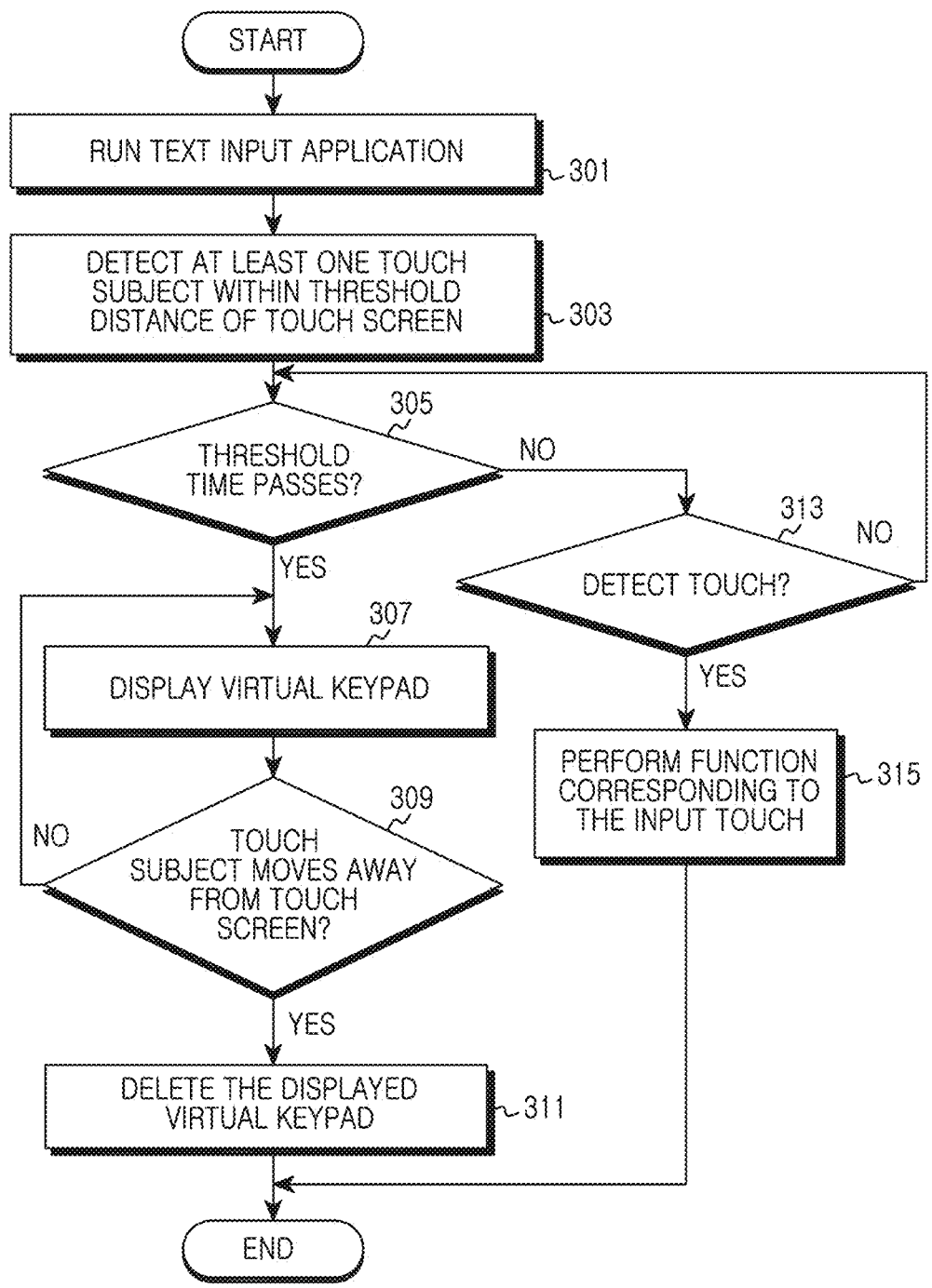
FIG. 3 is a flowchart of a method for displaying a virtual keypad when a touch subject is detected within a threshold distance of a touch screen in an electronic device according to an embodiment of the present disclosure.
Figure 4A:
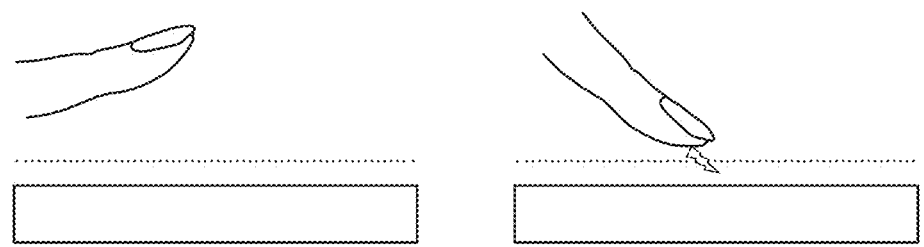
FIGS. 4A, 4B and 4C are diagrams of touch subject detection within a threshold distance of a touch screen in an electronic device according to an embodiment of the present disclosure.
Figure 4B:
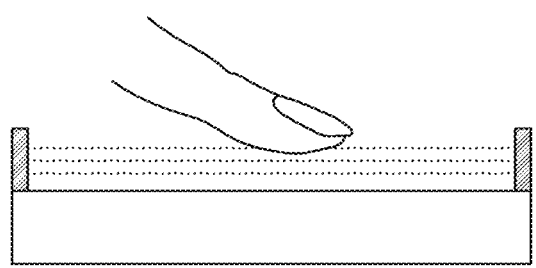
Figure 4C:
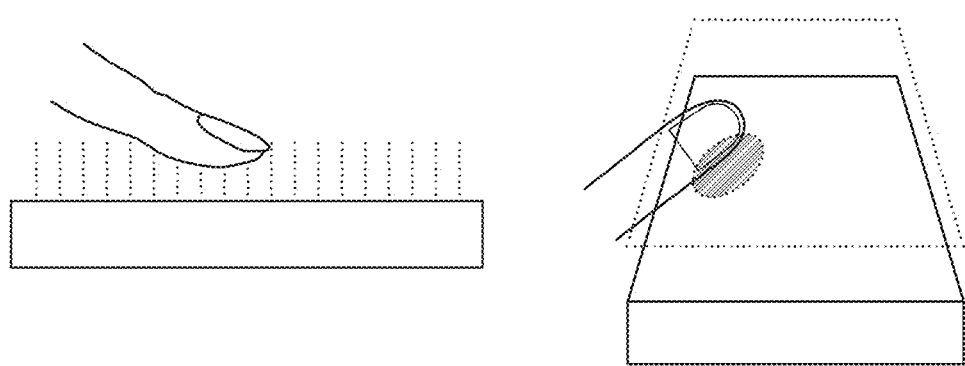
Figure 5A:
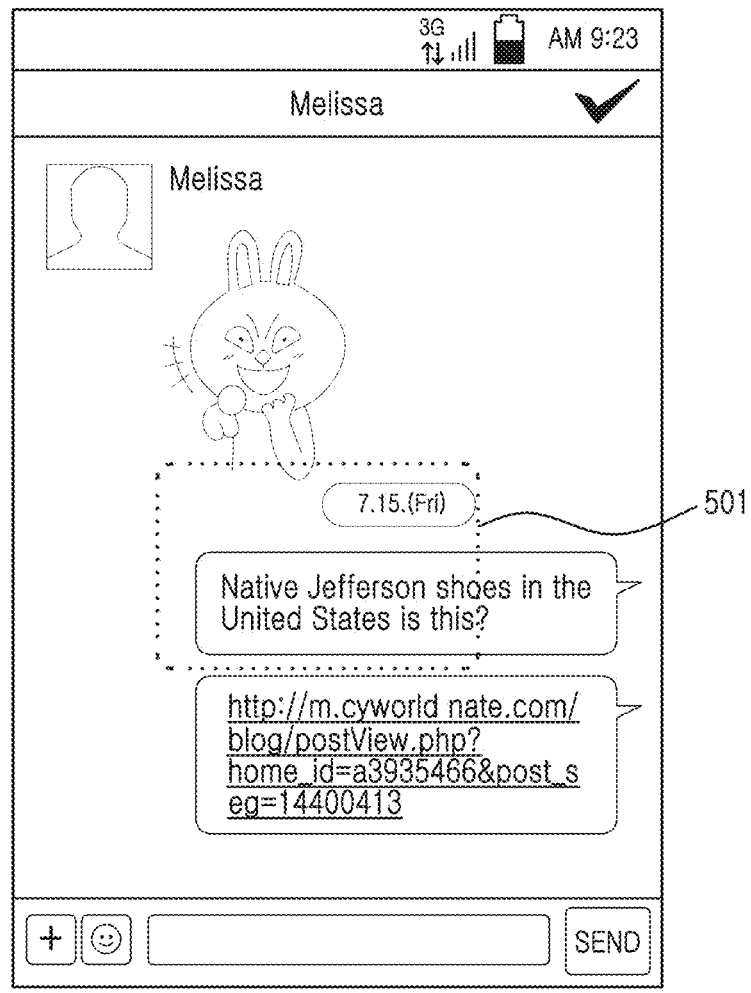
FIGS. 5A, 5B and 5C are diagrams of a threshold region for detecting a touch subject in an electronic device according to an embodiment of the present disclosure.
Figure 5B:
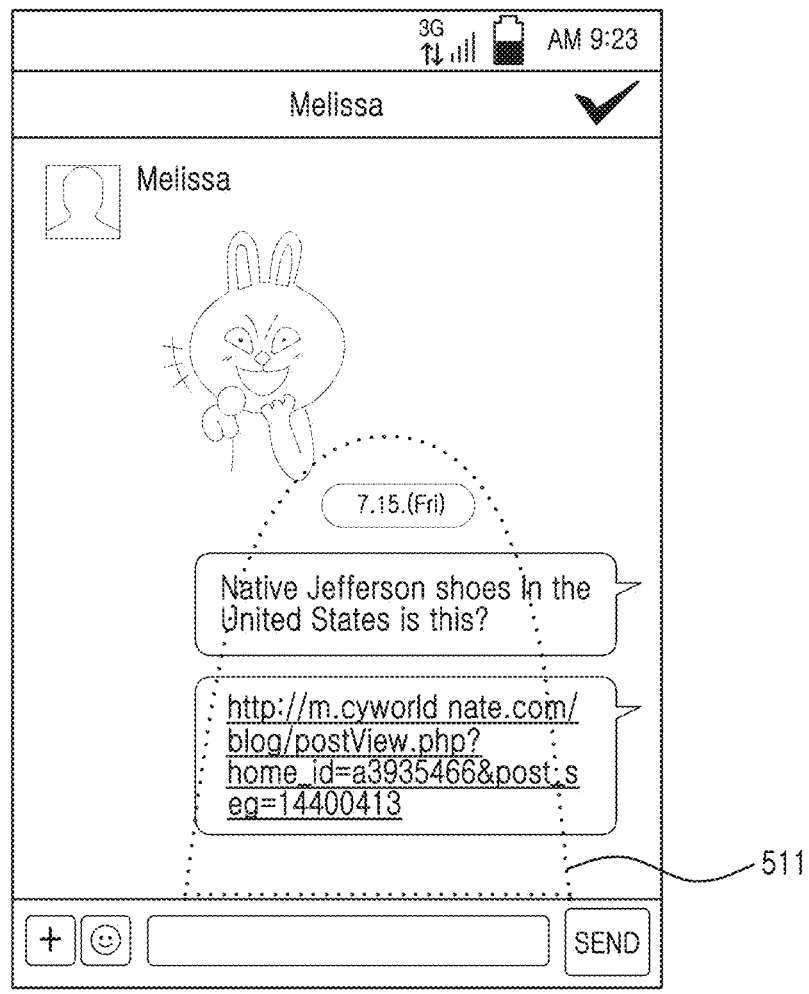
Figure 5C:
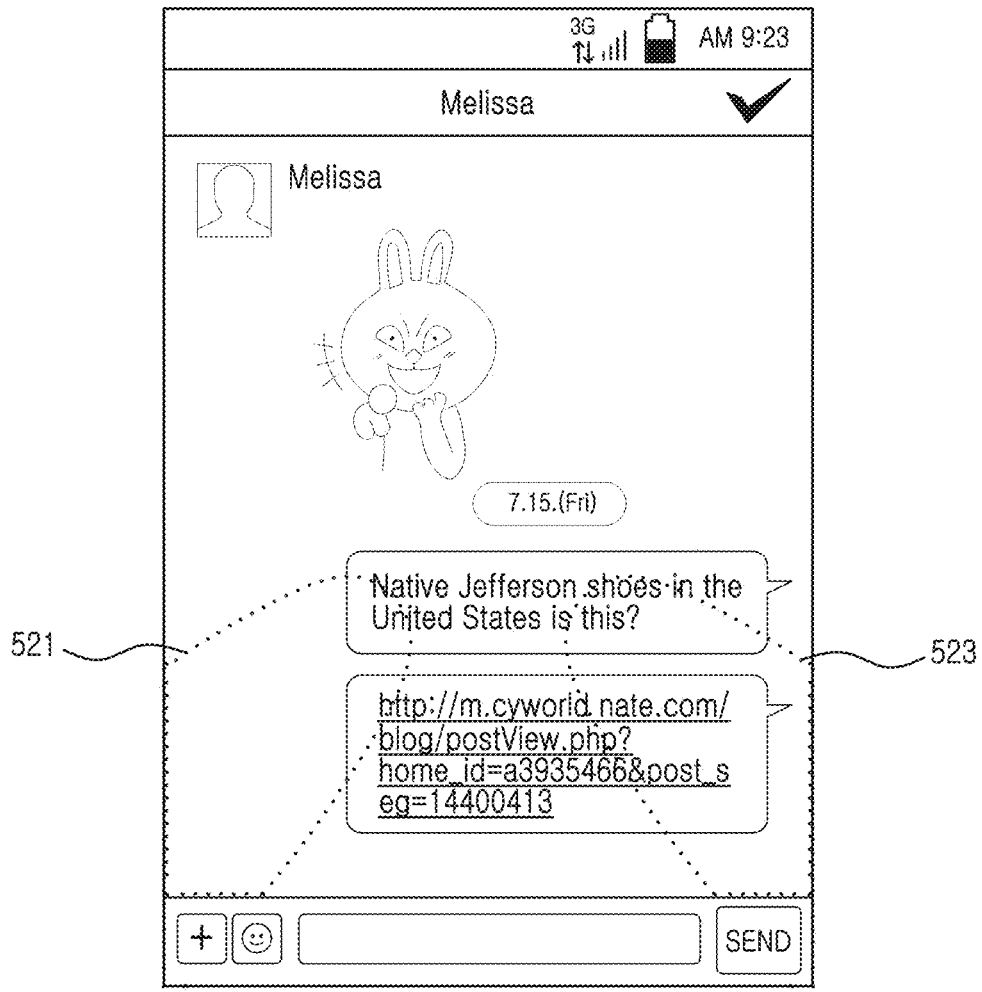
Figure 6A:
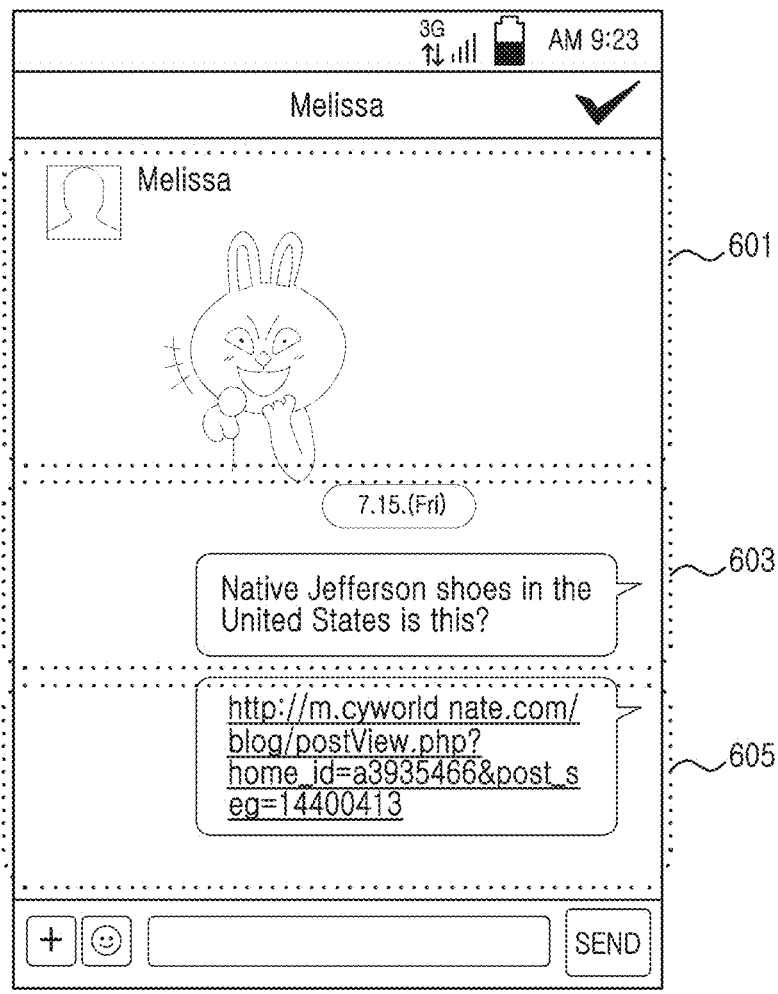
FIGS. 6A and 6B are diagrams of a threshold region segmented for detecting a touch subject in an electronic device according to an embodiment of the present disclosure.
Figure 6B:
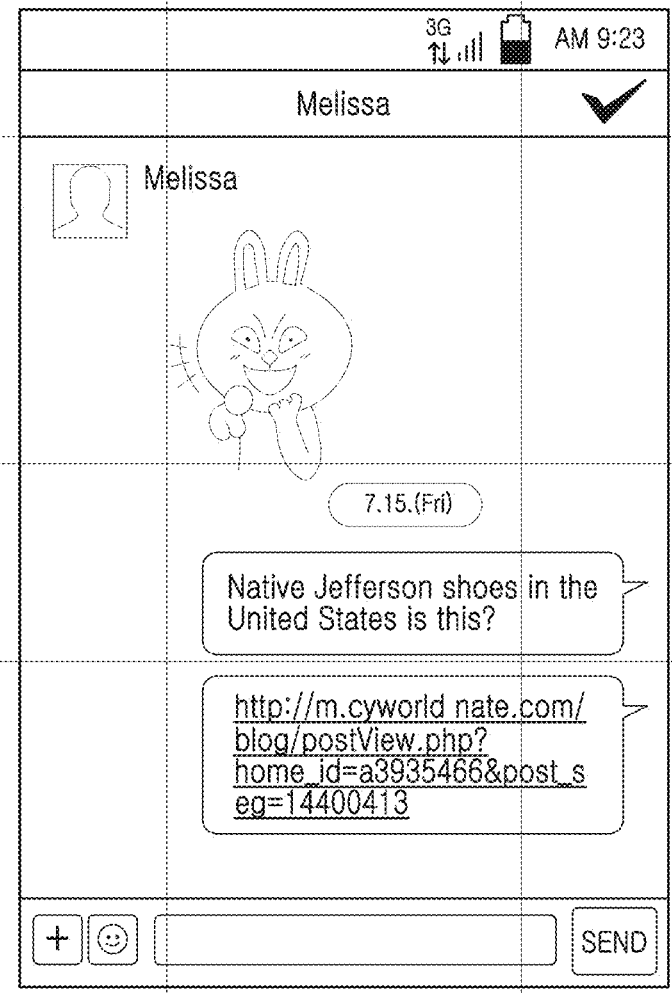
Figure 7A:
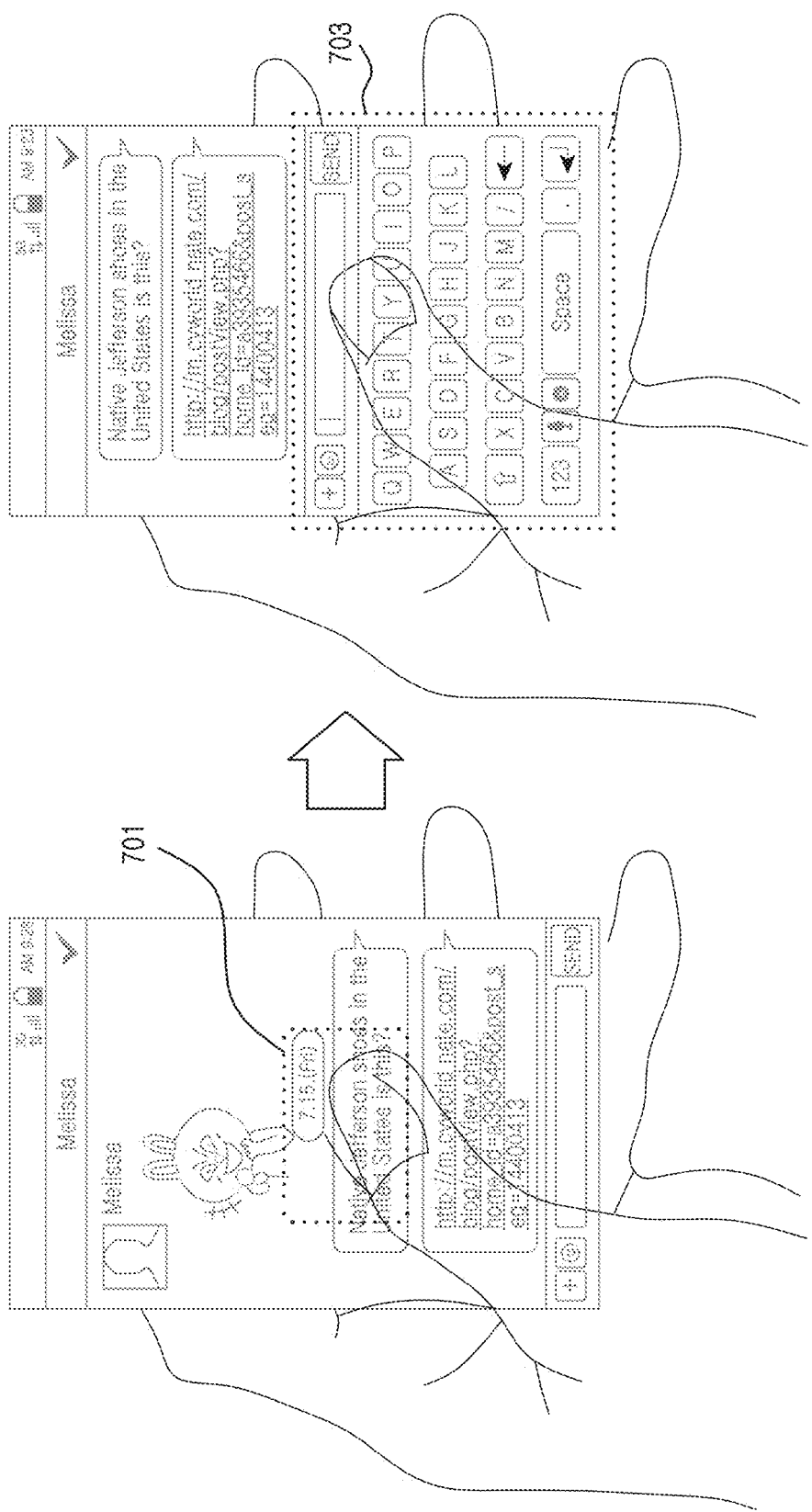
FIGS. 7A, 7B and 7C are diagrams of a displayed virtual keypad when a touch subject is detected within a threshold distance of a touch screen in an electronic device according to an embodiment of the present disclosure.
Figure 7B:
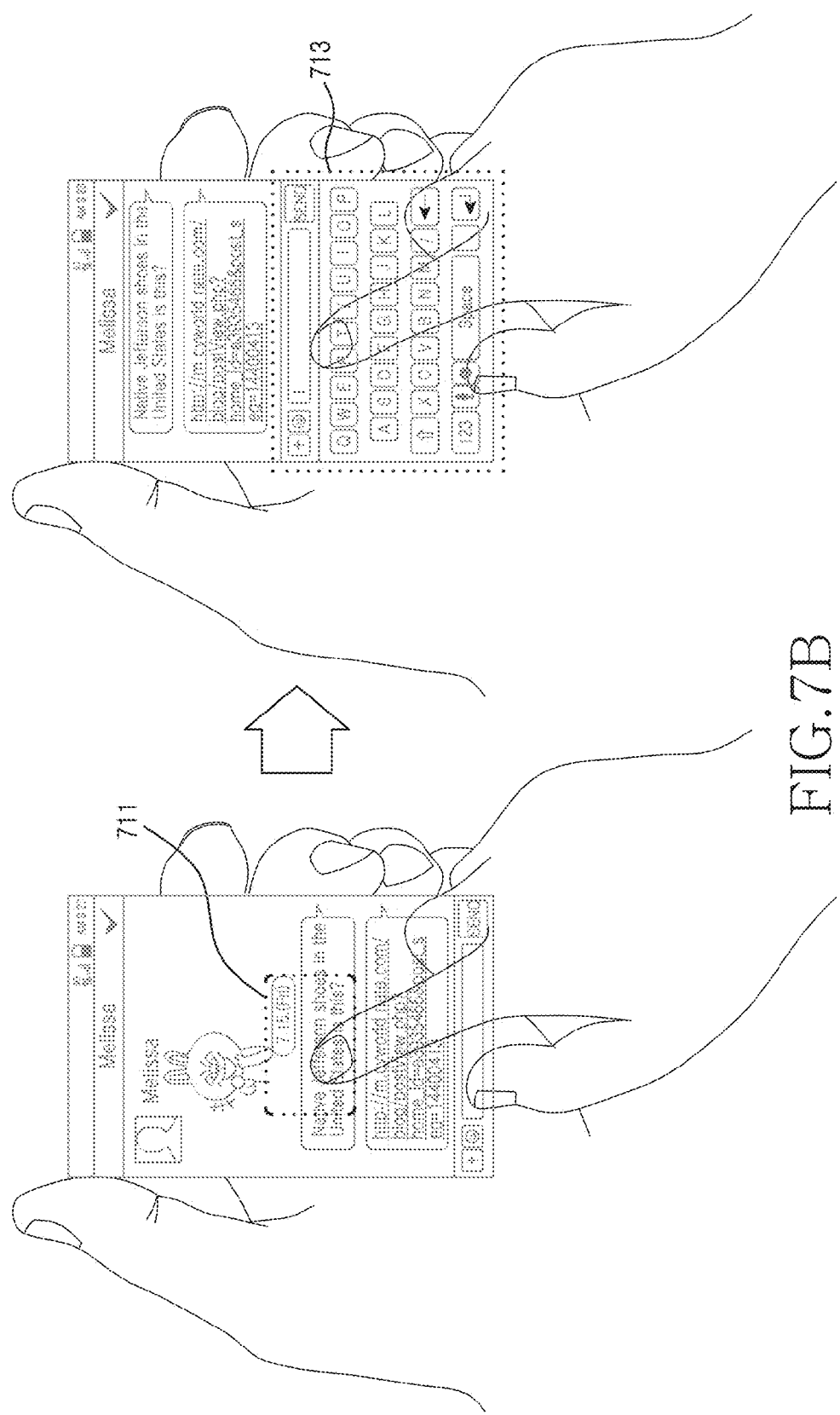
Figure 7C:
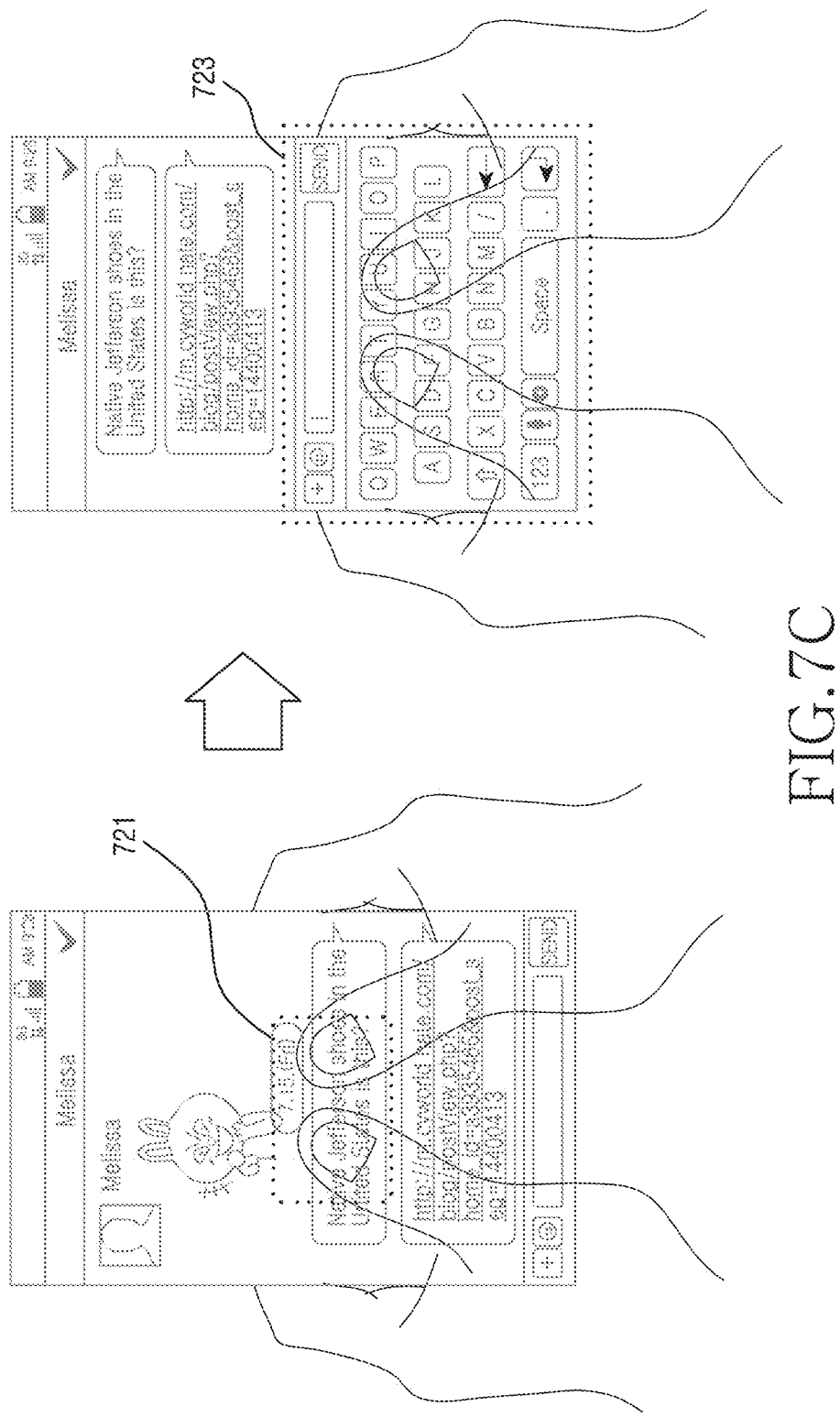
Figure 8A:
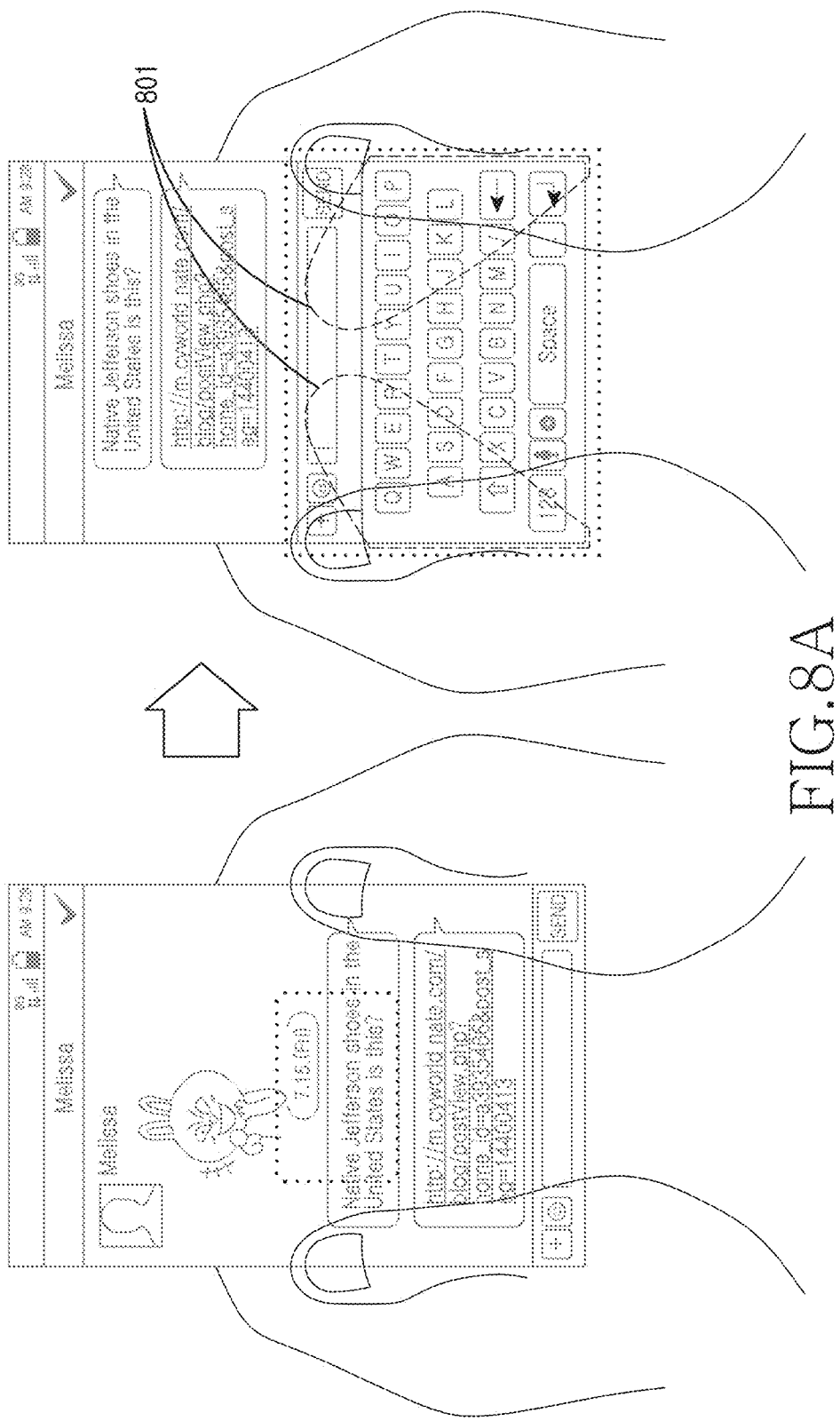
FIGS. 8A and 8B are diagrams of a touch guideline displayed when a touch subject is detected within a threshold distance of a touch screen in an electronic device according to an embodiment of the present disclosure.
Figure 8B:
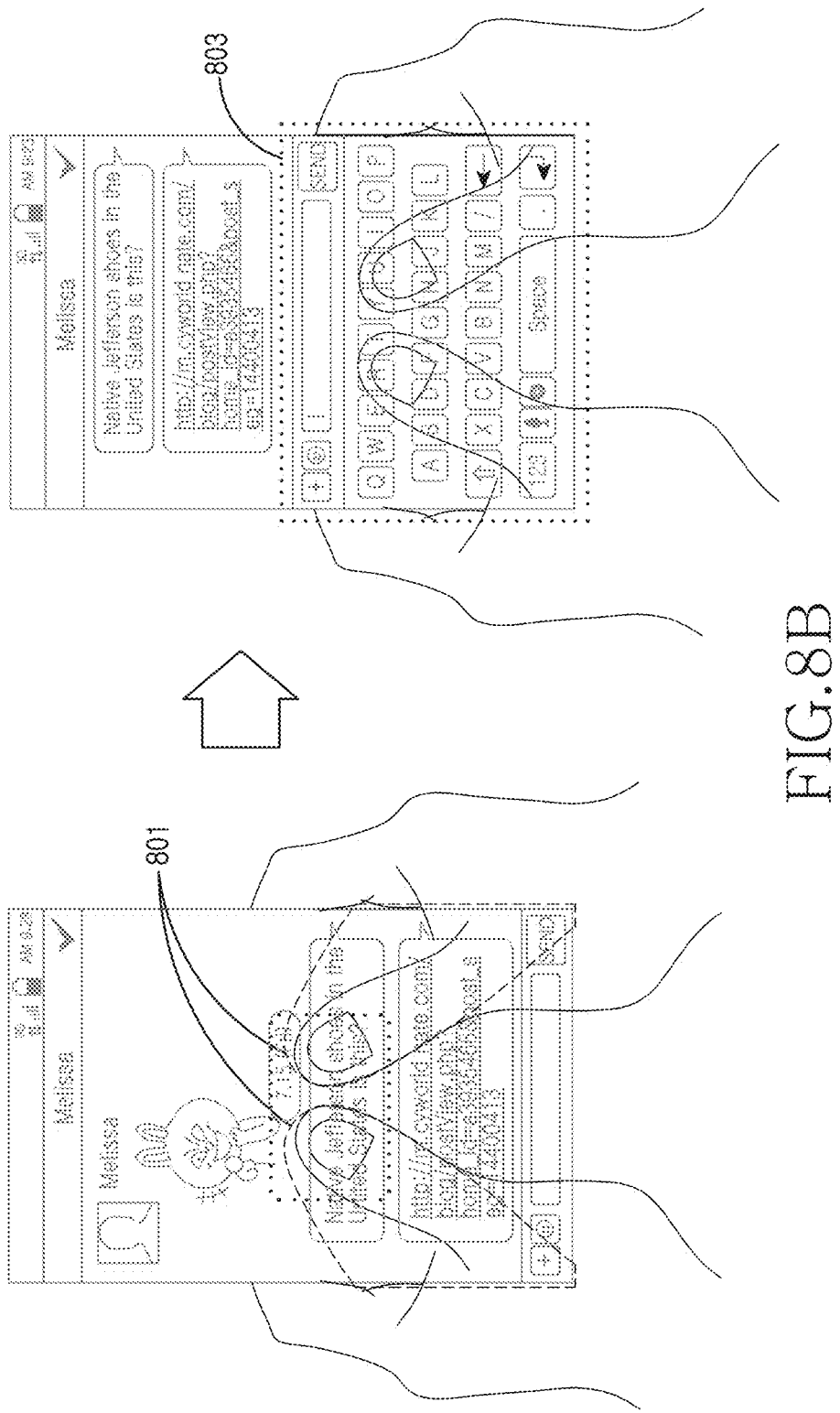
Figure 9:
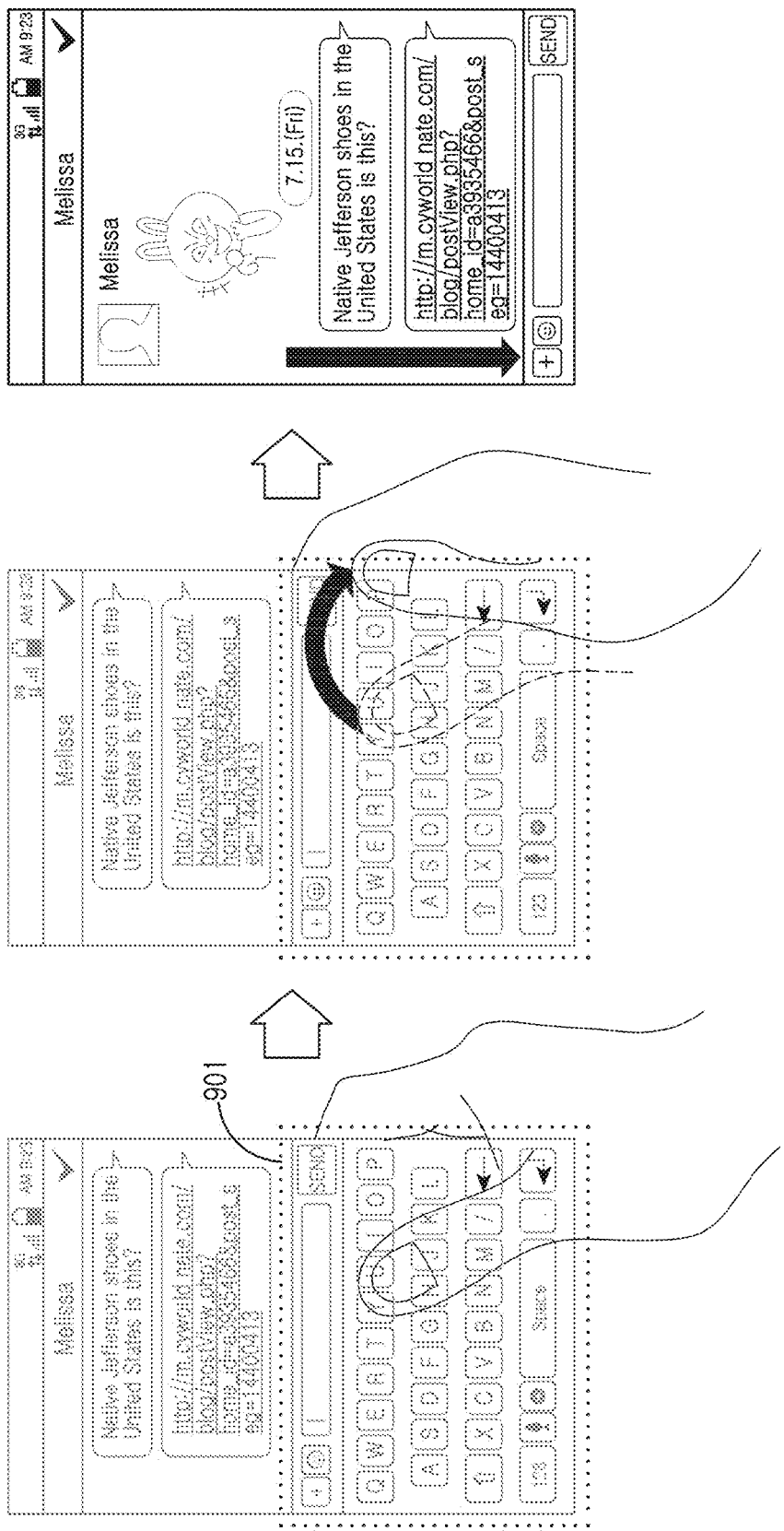
FIG. 9 is a diagram of a virtual keypad deleted when a touch subject moves away from a touch screen in an electronic device according to an embodiment of the present disclosure.
Figure 10:
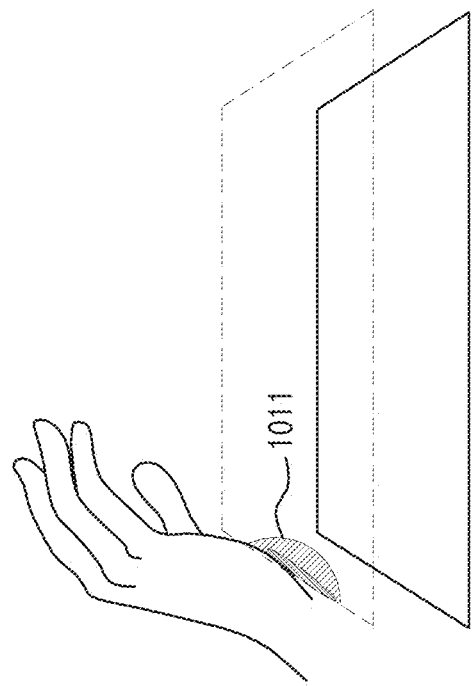
FIG. 10 is a diagram of a touch subject detection within a threshold distance of a touch screen when an electronic device includes a large-size touch screen according to an embodiment of the present disclosure.
Figure 10:
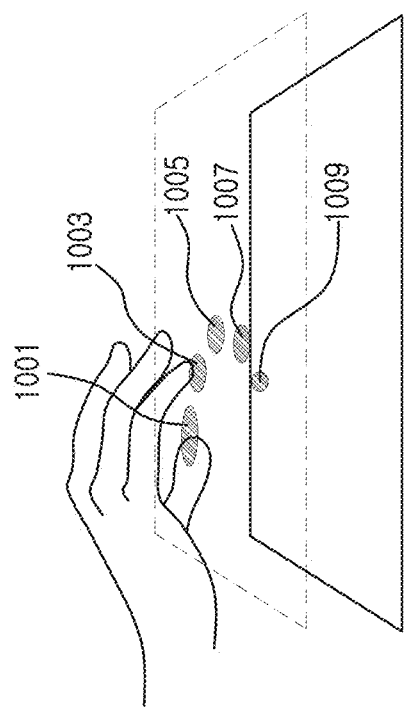

FIG. 3 is a flowchart of a method for displaying a virtual keypad when a touch subject is detected within a threshold distance of a touch screen in an electronic device according to an embodiment of the present disclosure. FIGS. 4A, 4B and 4C are diagrams of touch subject detection within a threshold distance of a touch screen in an electronic device according to an embodiment of the present disclosure. FIGS. 5A, 5B and 5C are diagrams of a threshold region for detecting a touch subject in an electronic device according to an embodiment of the present disclosure. FIGS. 6A and 6B are diagrams of a threshold region segmented for detecting a touch subject in an electronic device according to an embodiment of the present disclosure. FIGS. 7A, 7B and 7C are diagrams of a displayed virtual keypad when a touch subject is detected within a threshold distance of a touch screen in an electronic device according to an embodiment of the present disclosure. FIGS. 8A and 8B are diagrams of a touch guideline displayed when a touch subject is detected within a threshold distance of a touch screen in an electronic device according to an embodiment of the present disclosure. FIG. 9 is a diagram of a virtual keypad deleted when a touch subject moves away from a touch screen in an electronic device according to an embodiment of the present disclosure. FIG. 10 is a diagram of a touch subject detection within a threshold distance of a touch screen when an electronic device includes a large-size touch screen according to an embodiment of the present disclosure.

Referring to FIG. 3, at operation 301, the electronic device 100 detects the execution of the text input application. The text input application includes the message application, the messenger application, the Internet application, the note input application, and/or the like.

At operation 303, the electronic device 100 detects at least one touch subject within the threshold distance of the touch screen. The electronic device 100 can detect the touch subject within the threshold distance from the touch screen 130 the proximity sensor 140. For example, the electronic device 100 can detect the touch subject within the threshold distance from the touch screen 130 using at least one of the capacitive sensor, the inductive proximity sensor, the magnetic proximity sensor, the Hall sensor, the optical proximity sensor, the ultrasonic proximity sensor, and the like. For example, referring to FIG. 4A, the electronic device 100 can detect the user's finger within the threshold distance of the touch screen 130 by detecting a weak electrostatic signal from the user finger. As another example, referring to FIG. 4B, the electronic device 100 can detect the user's finger within the threshold distance of the touch screen 130 by detecting the light source reflected by the user finger. As another example, referring to FIG. 4C, the electronic device 100 including an array of electromagnetic radiation detectors can detect the area, the direction, and the number of the user fingers.

In so doing, the electronic device 100 can detect at least one touch subject within the threshold distance of a preset touch detection region. For example, referring to FIG. 5A, the electronic device 100 can set a touch detection region 501 of a particular shape and detect at least one touch subject within the threshold distance of the preset touch detection region 501. For example, referring to FIG. 5B, if the user controls the touch screen 130 with one finger, the electronic device 100 can set a touch detection region 511 of a finger shape and detect at least one touch subject within the threshold distance of the preset touch detection region 511. For example, referring to FIG. 5C, if the user controls the touch screen 130 with two fingers, the electronic device 100 can set two touch detection regions 521 and 523 of a finger shape and detect two touch subjects within the threshold distance of the preset touch detection regions 521 and 523. For example, the electronic device 100 can set the entire touch screen 130 to the touch detection region and detect at least one touch subject within the threshold distance of the preset touch detection region.

At operation 305, the electronic device 100 determines whether the at least one touch subject detected at operation 303 is detected for a threshold time. For example, at operation 305, when detecting the at least one touch subject at operation 303, the electronic device 100 determines whether the threshold time passes.

The touch detection region can include at least one region, and the electronic device 100 can set the threshold time per touch detection region. For example, referring to FIG. 6A, in three touch detection regions 601, 603, and 605. According to various embodiments of the present disclosure, the electronic device 100 can set various time thresholds (e.g., different time thresholds) for each detection region. The electronic device 100 can set a relatively long threshold time of the upper touch detection region 601 and the lower touch detection region 605, and a relatively short threshold time of the middle touch detection region 603. For example, referring to FIG. 6B, the electronic device 100 can subdivide the touch detection region into a plurality of regions and set different threshold times of the touch detection regions.

When the electronic device 100 determines that the threshold time passes at operation 305, the electronic device 100 proceeds to operation 307 at which the electronic device 100 displays the virtual keypad. For example, if the electronic device 100 determines that the at least one touch subject detected at operation 303 is detected for a threshold time, the electronic device proceeds to operation 307. As an example, referring to FIG. 7A, when the user's finger stays in the threshold distance of a preset touch detection region 701 over the threshold time, the electronic device 100 can display a virtual keypad 703. As another example, referring to FIG. 7B, when the user's finger stays in the threshold distance of a preset touch detection region 711 over the threshold time, the electronic device 100 can display a virtual keypad 713. As another example, referring to FIG. 7C, when the user's finger stays in the threshold distance of a preset touch detection region 721 over the threshold time, the electronic device 100 can display a virtual keypad 723. According to various embodiments of the present disclosure, when detecting the number of the touch subjects and detecting two or more touch subjects as illustrated in FIG. 7C, the electronic device 100 can immediately display the virtual keypad without measuring how long the touch subject stays in the threshold distance of the touch detection region 741. For example, when detecting a plurality of touch subjects in the touch detection region 721, the electronic device 100 can display the virtual keypad though the threshold time does not yet pass.

According to various embodiments of the present disclosure, when detecting the touch subject outside the touch detection region, the electronic device 100 can display a guideline of the touch detection region. For example, referring to FIG. 8A, when detecting the touch subject outside the touch detection region, the electronic device 100 can display a guideline 801 of the touch detection region. Next, referring to FIG. 8B, when detecting the touch subject in the guideline 801 of the displayed touch detection region, the electronic device 100 can display a virtual keypad 803. Herein, the guideline of the touch detection region is displayed to help the user to easily obtain the condition for displaying the virtual keypad in the electronic device 100.

At operation 309, the electronic device 100 determines whether the touch subject moves away from the touch screen 130.

If the electronic device 100 determines that the touch subject moves away from the touch screen 130 at operation 309, the electronic device 100 proceeds to operation 311 at which the electronic device 100 deletes the displayed virtual keypad (e.g., stops displaying the displayed virtual keypad). For example, when the touch subject moves away from the touch screen 130, the electronic device 100 deletes the displayed virtual keypad at operation 311 and then finishes this process. For example, referring to FIG. 9, when a virtual keypad 901 is displayed and the touch subject moves away from the touch screen 130, the electronic device 100 can delete the displayed virtual keypad 901 (e.g., stop displaying the displayed virtual keypad). In so doing, when the area of the detected touch subject falls below the threshold or the distance of the touch subject from the touch screen 130 exceeds the threshold distance, the electronic device 100 can delete the displayed virtual keypad (e.g., stop displaying the displayed virtual keypad).

In contrast, if the electronic device 100 determines that the touch subject does not move away from the touch screen 130 at operation 309, then the electronic device 100 returns to operation 307.

If the electronic device 100 determines that the at least one touch subject detected at operation 303 is detected not for a threshold time at operation 305, then the electronic device 100 proceeds to operation 313 at which the electronic device 100 determines whether a touch is detected. For example, when the threshold time does not pass at operation 305, the electronic device 100 determines whether the touch is detected at operation 313. At this time, the touch indicates the physical contact to the touch screen 130.

If the electronic device 100 determines that a touch is detected at operation 313, then the electronic device 100 proceeds to operation 315 at which the electronic device 100 performs a function corresponding to the detected input touch. For example, detecting the touch, the electronic device 100 performs the function corresponding to the input touch in operation 315 and then finishes this process.

In contrast, if the electronic device 100 does not detect a touch at operation 313, then the electronic device 100 returns to operation 305.

So far, the smart phone is controlled using one or two fingers to ease the understanding. Various embodiments of the present disclosure are applicable to an electronic device including a relatively large touch screen such as tablet PC. For example, referring to FIG. 10, when the electronic device 100 is the tablet PC (e.g., or another electronic device having a relatively large touch screen), the electronic device 100 can display the virtual keypad by setting touch detection regions 1001, 1003, 1005, 1007, and 1009 for detecting five fingers and detecting the touch fingers in the threshold distance of the touch screen 130, or by setting a touch detection region 1011 for detecting the palm and detecting the palm in the threshold distance of the touch screen 130 in the same manner as explained above. Herein, the electronic device 100 detects the palm to display the virtual keypad more quickly using a property that the user's palm generally touches the electronic device before the finger.

The various embodiments and various functional operations of the various embodiments of the present disclosure described herein can be implemented in computer software, firmware, hardware, or in combinations of one or more thereof including the structures disclosed in this specification and structural equivalents thereof. The various embodiments of the present disclosure can be implemented as one or more computer program products (e.g., one or more data processors), or one or more modules of computer program instructions encoded on a non-transient computer-readable medium to control the devices.

The non-transient computer-readable medium may be a machine-readable storage medium, a machine-readable storage substrate, a memory device, a material affecting a machine-readable propagated stream, or a combination of one or more of these. The term 'data processor' encompasses every device, apparatus, and machine including, for example, a programmable processor, a computer, a multiple processors, or a computer, for processing data. The device can be added to the hardware and include a program code for creating an execution environment of a corresponding computer program, for example, a code for constituting processor firmware, a protocol stack, a database management system, an operating system, or a combination of one or more thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
    displaying, on a touch screen of the electronic device, a user interface (UI) regarding an application within a first area;
    displaying, in response to detecting that a touch subject is located over a second area other than a third area, a guideline indicating a location of the third area configured for displaying a virtual keypad in response to detecting that the touch subject is located over the third area, wherein the guideline is superimposed on the UI and is displayed within the third area; and
    displaying, in response to detecting that the touch subject is moved to a location over the third area, the virtual keypad superimposed on the UI and ceasing displaying the guideline,
    wherein the third area is included in the first area.

2. The method of claim 1, wherein the detecting the touch subject comprises,
    detecting that the touch subject is located within a threshold distance from a detection area of the touch screen.

3. The method of claim 2, wherein the detecting that the touch subject is located within the threshold distance comprises,
    determining, in response to detecting that the touch subject stays within the threshold distance from the detection area during a threshold interval, that the touch subject is located within the threshold distance.

4. The method of claim 2, wherein detecting that the touch subject is located within the threshold distance comprises, determining, in response to detecting a plurality of touch subjects within the threshold distance from the detection area, a touch input inputted by the plurality of touch subjects on the touch screen.

5. The method of claim 1,
    wherein the second area comprises at least one preset touch region, and
    wherein each of the at least one preset touch region is configured to have a different threshold interval for detecting the touch subject located within a threshold distance from the each of the at least one preset touch region.

6. The method of claim 1, further comprising:
    periodically measuring a distance between the touch subject and the touch screen on which the virtual keypad is displayed; and
    if the measured distance is above a threshold distance, ceasing to display the virtual keypad.

7. The method of claim 1, further comprising:
    measuring, in response to detecting the touch subject on which the virtual keypad is displayed, a portion of the detected touch subject on the touch screen; and
    if a size of the portion of the detected touch subject is smaller than a threshold value, ceasing to display the virtual keypad.

8. The method of claim 1, further comprising:
    periodically measuring a distance between the touch subject and the touch screen on which the virtual keypad is displayed; and
    adjusting display characteristics of the virtual keypad according to the measured distance,
    wherein the display characteristics comprise at least one of a color, a transparency, a size, a shape, or a thickness of the virtual keypad.

9. The method of claim 1, further comprising:
    periodically measuring, in response to detecting the touch subject on which the virtual keypad is displayed, a portion of the detected touch subject on the touch screen; and
    adjusting display characteristics of the virtual keypad according to a size of the measured portion,
    wherein the display characteristics comprise at least one of a color, a transparency, a size, a shape, or a thickness of the virtual keypad.

10. The method of claim 1,
    wherein the touch subject comprises at least one of a finger of a user of the electronic device, a digital pen, and a touchable object.

11. An electronic device comprising:
    a touch screen;
    a memory storing instructions; and
    a processor, coupled with the touch screen and the memory, configured to execute the stored instructions to:
        display, on the touch screen of the electronic device, a user interface (UI) regarding an application within a first area,
        display, in response to detecting that a touch subject is located over a second area other than a third area, a guideline indicating a location of the third area configured for displaying a virtual keypad in response to detecting that the touch subject is located over the third area, wherein the guideline is superimposed on the UI and is displayed within the third area, and
        display, in response to detecting that the touch subject is moved to a location over the third area, the virtual keypad superimposed on the UI and ceasing displaying the guideline,
    wherein the third area is included in the first area.

12. The electronic device of claim 11, wherein the detecting the touch subject comprises
    detecting that the touch subject is located within a threshold distance from a detection area of the touch screen.

13. The electronic device of claim 12, wherein the detecting that the touch subject is located within the threshold distance comprises
    determining, in response to detecting that the touch subject stays within the threshold distance from the detection area during a threshold interval, that the touch subject is located within the threshold distance.

14. The electronic device of claim 12, wherein detecting that the touch subject is located within the threshold distance comprises determining, in response to detecting a plurality of touch subjects within the threshold distance from the detection area, a touch input inputted by the plurality of touch subjects on the touch screen.

15. The electronic device of claim 12,
    wherein the second area comprises at least one preset touch region, and
    wherein each of the at least one preset touch region is configured to have a different threshold interval for detecting that the touch subject is located within a threshold distance from the each of the at least one preset touch region.

16. The electronic device of claim 11, wherein the at least one processor is further configured to execute the stored instructions to:
    periodically measure a distance between the touch subject and the touch screen on which the virtual keypad is displayed; and if the measured distance is above a threshold distance, ceasing to display the virtual keypad.

17. The electronic device of claim 11, wherein the at least one processor is further configured to execute the stored instructions to:
   measure, in response to detecting the touch subject on which the virtual keypad is displayed, a portion of the detected touch subject on the touch screen, and
   if a size of the portion of the detected touch subject is smaller than a threshold value, ceasing to display the virtual keypad.

18. The electronic device of claim 11, wherein the at least one processor is further configured to execute the stored instructions to:
   periodically measure a distance between the touch subject and the touch screen on which the virtual keypad is displayed, and
   adjust display characteristics of the virtual keypad according to the measured distance,
   wherein the display characteristics comprise at least one of a color, a transparency, a size, a shape, or a thickness of the virtual keypad.

19. The electronic device of claim 11, wherein the at least one processor is further configured to execute the stored instructions to:
   periodically measure, in response to detecting the touch subject on which the virtual keypad is displayed, a portion of the detected touch subject on the touch screen, and
   adjust display characteristics of the virtual keypad according to a size of the measured portion,
   wherein the display characteristics comprise at least one of a color, a transparency, a size, a shape, or a thickness of the virtual keypad.

20. The electronic device of claim 11,
   wherein the
   touch subject comprises at least one of a finger of a user of the electronic device, a digital pen, and a touchable object.

* * * * *